US010635905B2

(12) United States Patent
Newcombe et al.

(10) Patent No.: US 10,635,905 B2
(45) Date of Patent: Apr. 28, 2020

(54) AUGMENTED REALITY MAPPING SYSTEMS AND RELATED METHODS

(71) Applicant: Facebook Technologies, LLC, Menlo Park, CA (US)

(72) Inventors: Richard Andrew Newcombe, Seattle, WA (US); Jakob Julian Engel, Seattle, WA (US); Julian Straub, Redmond, WA (US); Thomas John Whelan, Redmond, WA (US); Steven John Lovegrove, Woodinville, WA (US); Yuheng Ren, Newcastle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/131,066

(22) Filed: Sep. 14, 2018

(65) Prior Publication Data
US 2020/0089953 A1    Mar. 19, 2020

(51) Int. Cl.
*G06K 9/00* (2006.01)
*G06T 19/00* (2011.01)
*H04W 4/33* (2018.01)
*H04W 4/029* (2018.01)
*H04W 4/021* (2018.01)

(52) U.S. Cl.
CPC ........ *G06K 9/00671* (2013.01); *G06T 19/006* (2013.01); *H04W 4/021* (2013.01); *H04W 4/029* (2018.02); *H04W 4/33* (2018.02)

(58) Field of Classification Search
None
See application file for complete search history.

(56) References Cited

U.S. PATENT DOCUMENTS

2017/0024917 A1 * 1/2017 Deitrich ................. G06T 11/60
2019/0033989 A1 * 1/2019 Wang ..................... G06F 3/0346

* cited by examiner

*Primary Examiner* — Yi Wang
(74) *Attorney, Agent, or Firm* — FisherBroyles, LLP (57) ABSTRACT

The disclosed computer-implemented method may include receiving, from devices in an environment, real-time data associated with the environment. The method may also include determining, from the real-time data, current mapping and object data. The current mapping data may include coordinate data for the environment and the current object data may include both state data and relationship data for objects in the environment. The method may also include determining mapping deltas between the current mapping data and baseline map data and determining object deltas between the current object data and an event graph. The event graph may include prior state data and prior relationship data for objects. The method may also include updating the baseline map data and the event graph based on the deltas and sending updated baseline map data and event graph data to the devices. Various other methods, systems, and computer-readable media are also disclosed.

20 Claims, 7 Drawing Sheets

AUGMENTED REALITY MAPPING SYSTEMS AND RELATED METHODS

BACKGROUND

Augmented reality (AR) devices typically augment a user's real-world environment with computer-generated information. For example, AR devices may alter a user's perception of his or her real-world environment by overlaying visual information onto the user's normal view. By doing so, AR devices may provide an immersive experience for end users without completely replacing the user's view of their real-world environment.

AR devices may be used for games and other interactive entertainment applications. For example, AR applications often display virtual objects as if the virtual objects were in the real world. Users may then interact with the virtual objects. As AR devices become more common, however, users may also wish to use AR technology to further enhance their perception of real-world environments.

SUMMARY

As will be described in greater detail below, the instant disclosure describes an AR mapping system capable of mapping a real-world environment based on input from multiple AR devices. In one example, a computer-implemented method for performing such a task may include (1) receiving, from a plurality of devices in an environment, real-time data associated with the environment and (2) determining, from the real-time data, current mapping data and current object data for the environment. The current mapping data may include coordinate data for the environment and the current object data may include both state data and relationship data for objects in the environment detected by the plurality of devices. The method may also include (3) determining mapping deltas between the current mapping data and baseline map data that includes features of the environment and (4) determining object deltas between the current object data and an event graph. The event graph may include prior state data and prior relationship data for objects in the environment. In addition, the method may include (5) updating the baseline map data based on the mapping deltas and updating the event graph based on the object deltas and (6) sending updated baseline map data and updated event graph data to the plurality of devices.

In some examples, the state data of the event graph may include space-time state data of the objects in the environment that indicates position data over time of the objects in the environment. The relationship data of the event graph may include transition data linking nodes of the space-time state data. The transition data may correspond to events that indicate interactions between the objects in the environment.

In some examples, updating the event graph based on the object deltas may further include recognizing an object in the object deltas as an object in the event graph, creating a new node for the recognized object in the event graph based on state data from the object deltas, and linking the new node with a prior node for the recognized object in the event graph based on relationship data from the object deltas.

In some examples, the baseline map data may include at least one of a floor plan, a wall, a ceiling, a structural feature, or a static furniture item in the environment. In some examples, the objects in the environment may include at least one of an inanimate object or a human.

In some examples, the state data for a human may include at least one of a head pose, an eye state, audio data, a hand state, a breathing rate, or a heart rate. In some examples, the state data for an inanimate object may include at least one of an object type, an instance identification, a pose, or an attribute.

In addition, a corresponding AR mapping system may include one or more processors and a memory device comprising instructions that, when executed by the one or more processors, cause the system to receive, from a plurality of devices in an environment, real-time data associated with the environment. The instructions may also cause the system to determine, from the real-time data, current mapping data and current object data for the environment. The current mapping data may include coordinate data for the environment and the current object data may include both state data and relationship data for objects in the environment detected by the plurality of devices. The instructions may also cause the system to determine mapping deltas between the current mapping data and baseline map data that includes features of the environment and determine object deltas between the current object data and an event graph. The event graph may include prior state data and prior relationship data for objects in the environment. The instructions may also cause the system to update the baseline map data based on the mapping deltas and updating the event graph based on the object deltas and send updated baseline map data and updated event graph data to the plurality of devices.

In some examples, the state data of the event graph may include space-time state data of the objects in the environment that indicates position data over time of the objects in the environment, and the relationship data of the event graph may include transition data linking nodes of the space-time state data. The transition data may correspond to events that indicate interactions between the objects in the environment In some examples, the instructions for updating the event graph based on the object deltas further include instructions for recognizing an object in the object deltas as an object in the event graph, creating a new node for the recognized object in the event graph based on state data from the object deltas, and linking the new node with a prior node for the recognized object in the event graph based on relationship data from the object deltas.

In some examples, the baseline map data may include at least one of a floor plan, a wall, a ceiling, a structural feature, or a static furniture item in the environment. In some examples, the objects in the environment may include at least one of an inanimate object or a human. The state data for a human may include at least one of a head pose, an eye state, audio data, a hand state, a breathing rate, or a heart rate, and the state data for an inanimate object may include at least one of an object type, an instance identification, a pose, or an attribute.

In some examples, the above-described method may be encoded as computer-readable instructions on a computer-readable medium. For example, a computer-readable medium may include one or more computer-executable instructions that, when executed by at least one processor of a computing device, may cause the computing device to (1) receive, from a plurality of devices in an environment, real-time data associated with the environment and (2) determine, from the real-time data, current mapping data and current object data for the environment. The current mapping data may include coordinate data for the environment and the current object data may include both state data and relationship data for objects in the environment detected by the plurality of devices. The instructions may also cause the computing device to (3) determine mapping deltas between the current mapping data and baseline map data that includes features of the environment and (4) determine object deltas between the current object data and an event graph. The event graph may include prior state data and prior relationship data for objects in the environment. The instructions may also cause the computing device to (5) update the baseline map data based on the mapping deltas and updating the event graph based on the object deltas and (6) send updated baseline map data and updated event graph data to the plurality of devices.

In some examples, the state data of the event graph may include space-time state data of the objects in the environment that indicates position data over time of the objects in the environment, and the relationship data of the event graph may include transition data linking nodes of the space-time state data. In some examples, the transition data may correspond to events that indicate interactions between the objects in the environment.

In some examples, updating the event graph based on the object deltas may further include recognizing an object in the object deltas as an object in the event graph, creating a new node for the recognized object in the event graph based on state data from the object deltas, and linking the new node with a prior node for the recognized object in the event graph based on relationship data from the object deltas.

In some examples, the baseline map data may include at least one of a floor plan, a wall, a ceiling, a structural feature, or a static furniture item in the environment. In some examples, the objects in the environment may include at least one of an inanimate object or a human. The state data for a human may include at least one of a head pose, an eye state, audio data, a hand state, a breathing rate, or a heart rate, and the state data for an inanimate object may include at least one of an object type, an instance identification, a pose, or an attribute.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to an AR mapping system. As will be explained in greater detail below, embodiments of the instant disclosure may involve receiving real-time data associated with a real-world environment from a plurality of devices. An AR mapping system may determine current mapping data and current object data for the environment based on the real-time data. The AR mapping system may then update both baseline map data and an event graph using the current mapping data and the current object data. By aggregating real-time data received from multiple devices, the AR mapping system may provide improved mapping capabilities including objects in the environment. This system may also improve the function of a computing device by providing an efficient system for aggregating real-time data and improved storage for data representing real-world objects and interactions therebetween. The system may further improve mapping technology by providing a system capable of real-time awareness of objects in the environment. In addition, the system may improve AR technology by aggregating data from multiple AR devices to enhance each AR device.

Figure 1:
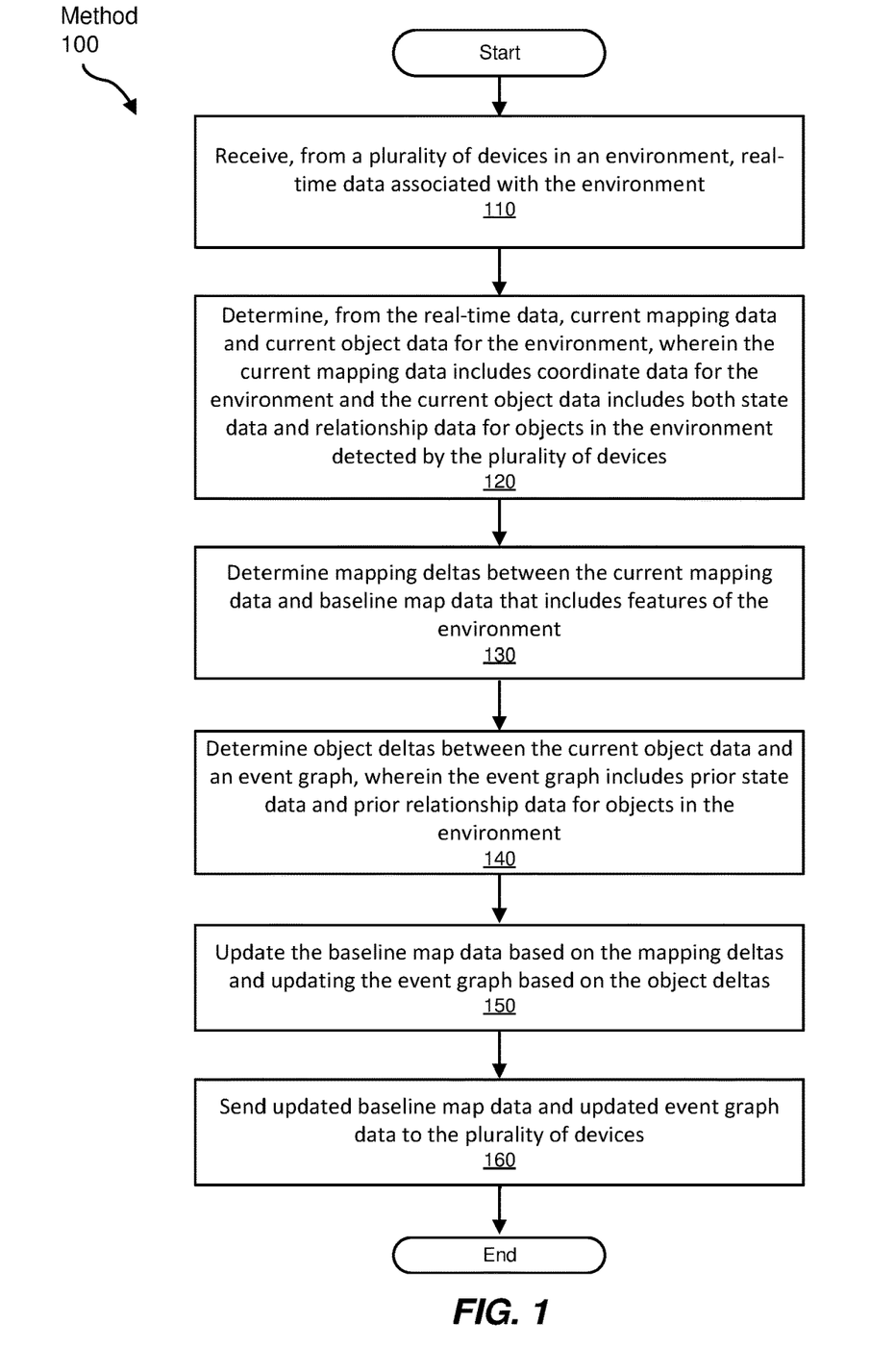
FIG. 1 is a flow diagram of an exemplary method for AR mapping, according to aspects of the present disclosure.
Figure 2:
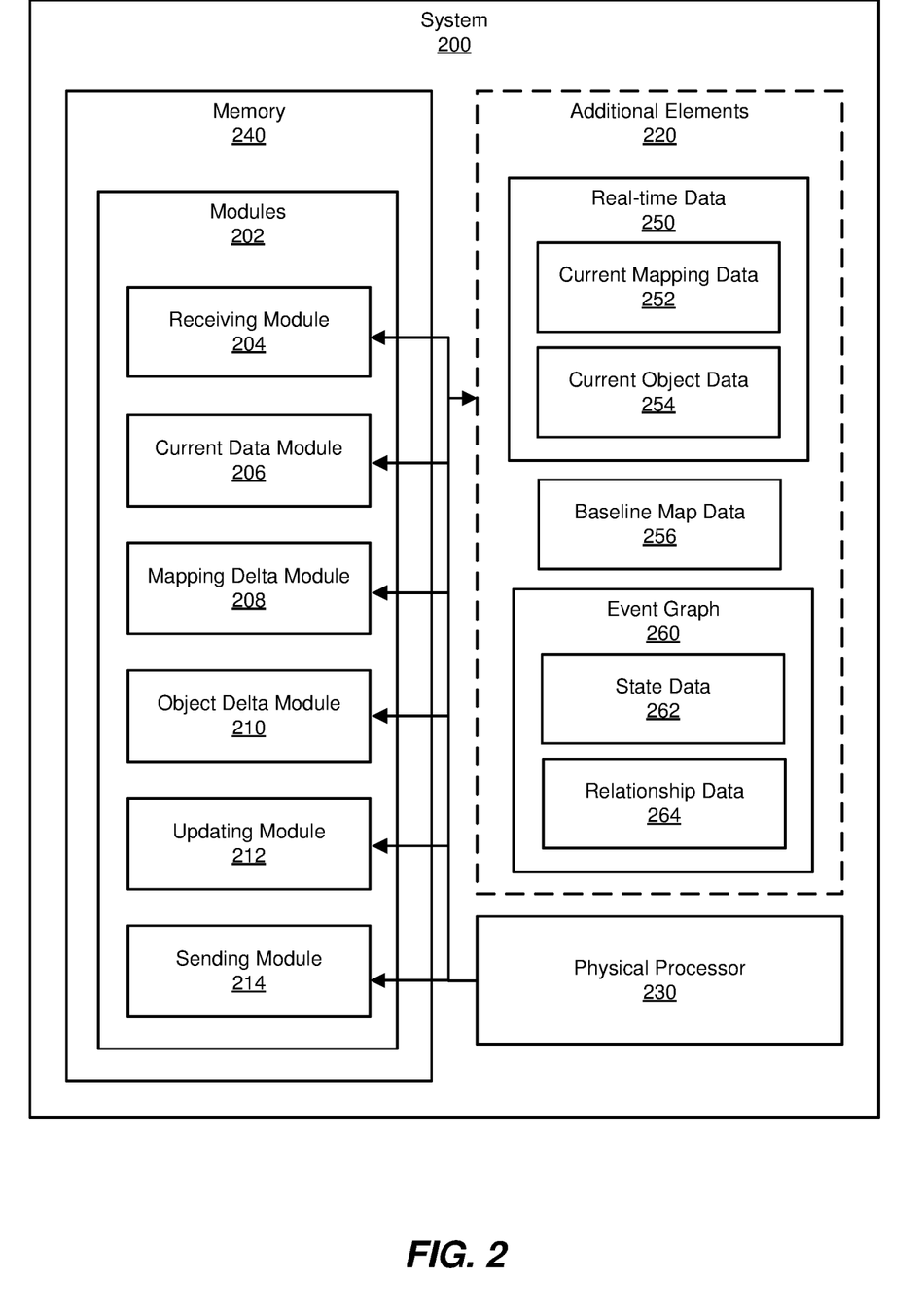
FIG. 2 is a block diagram of an exemplary system for an AR mapping system, according to aspects of the present disclosure.
Figure 3:
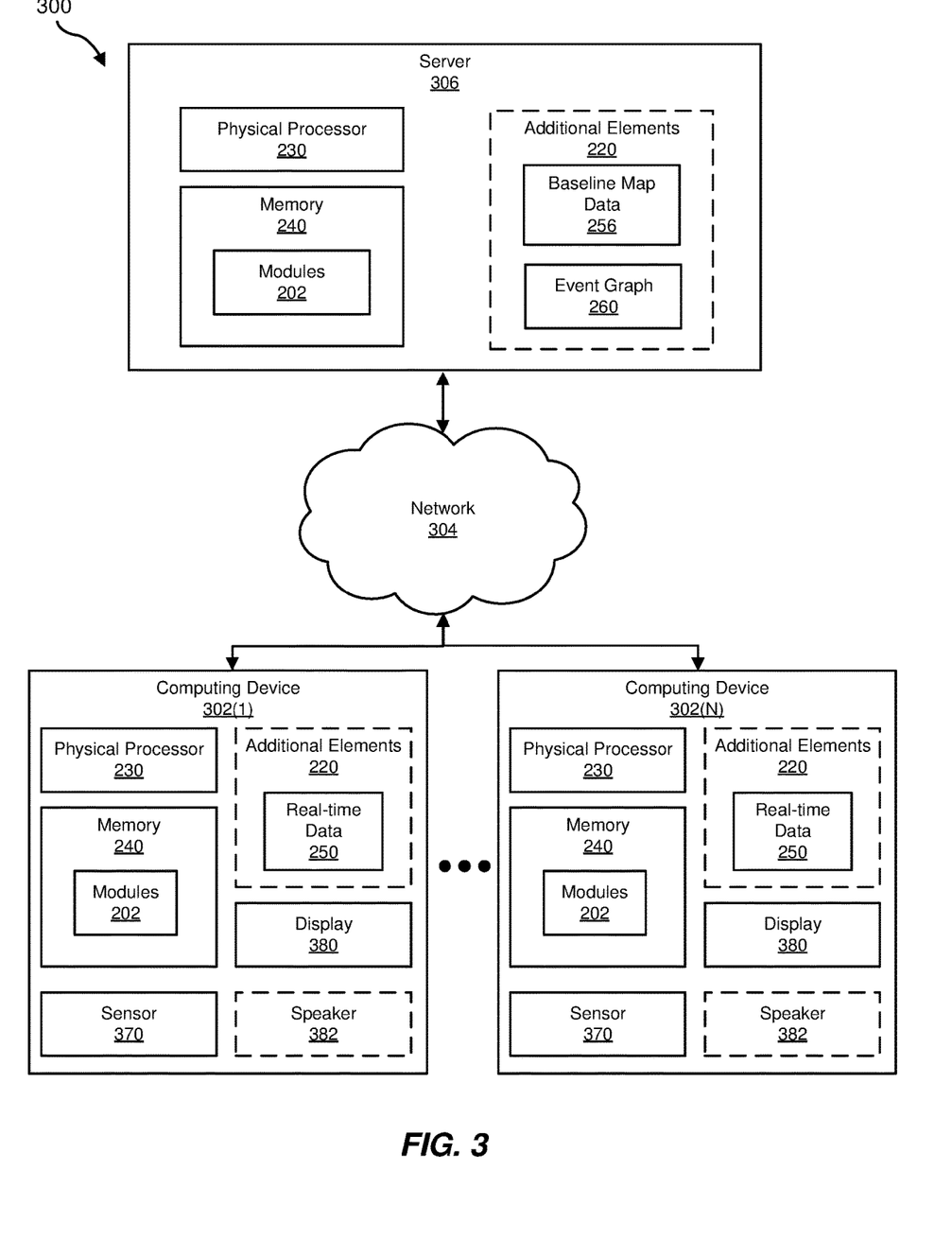
FIG. 3 is a block diagram of an exemplary network for the AR mapping system, according to aspects of the present disclosure.
Figure 4:
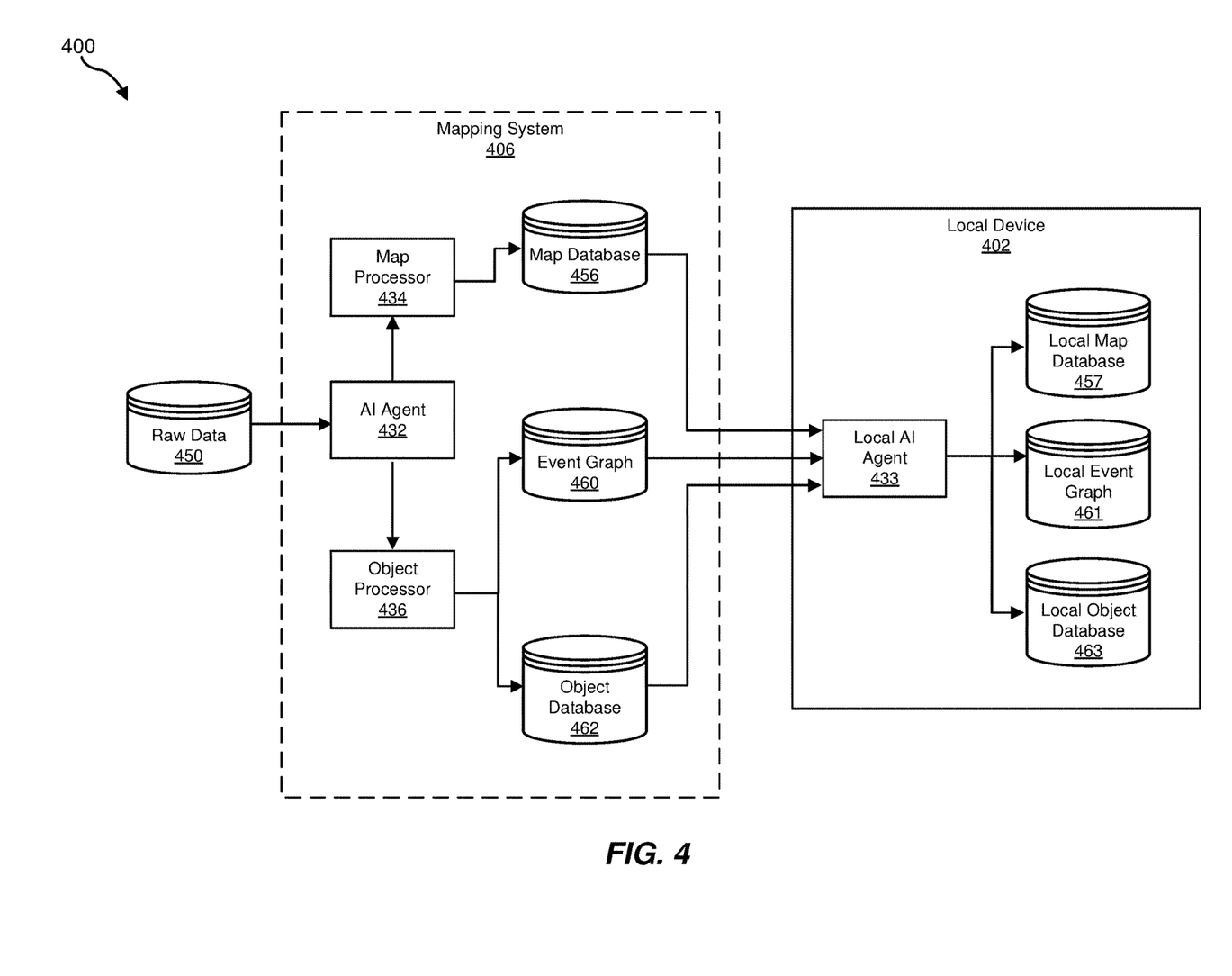
FIG. 4 is a diagram of an exemplary pipeline for an AR mapping system, according to aspects of the present disclosure.
Figure 5A:
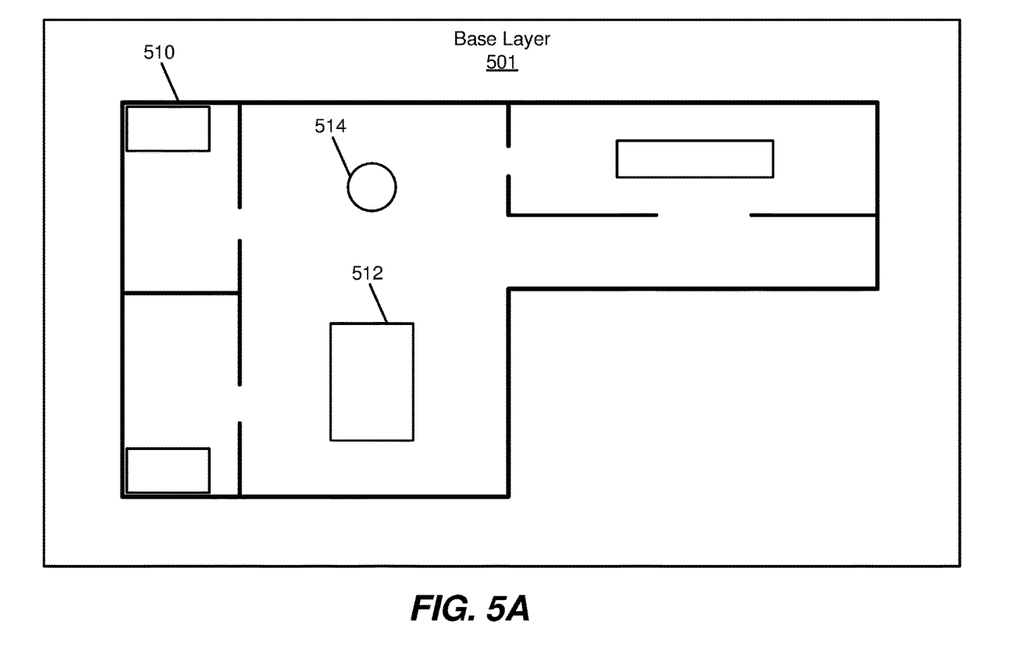
FIGS. 5A-5B are exemplary mapping layers for an AR mapping system, according to aspects of the present disclosure.
Figure 5B:
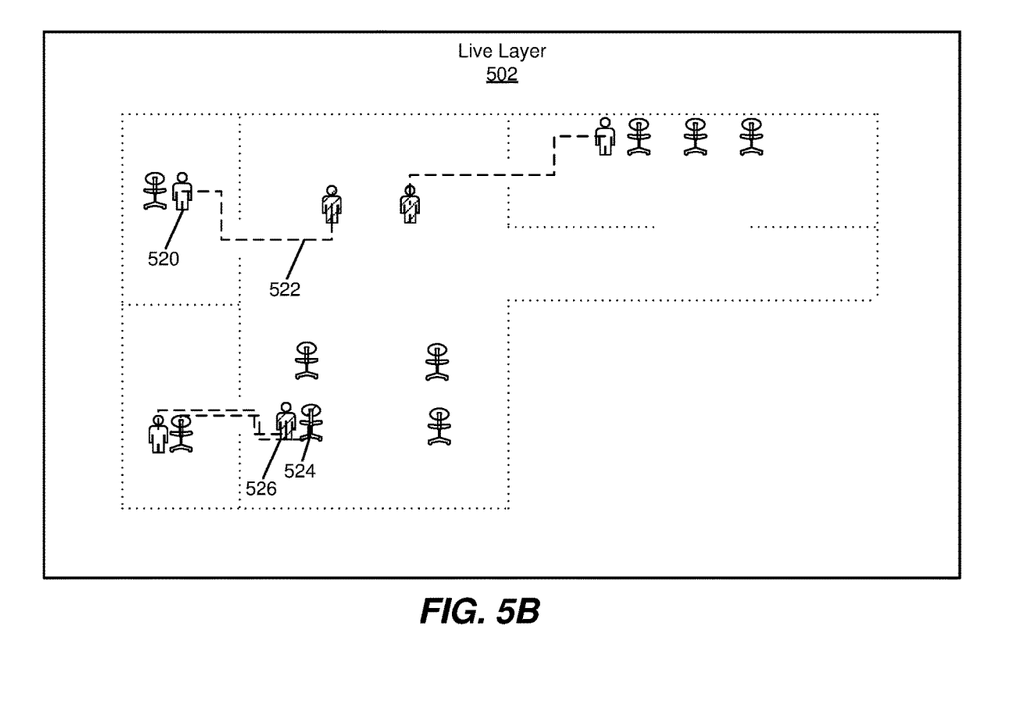
Figure 6:
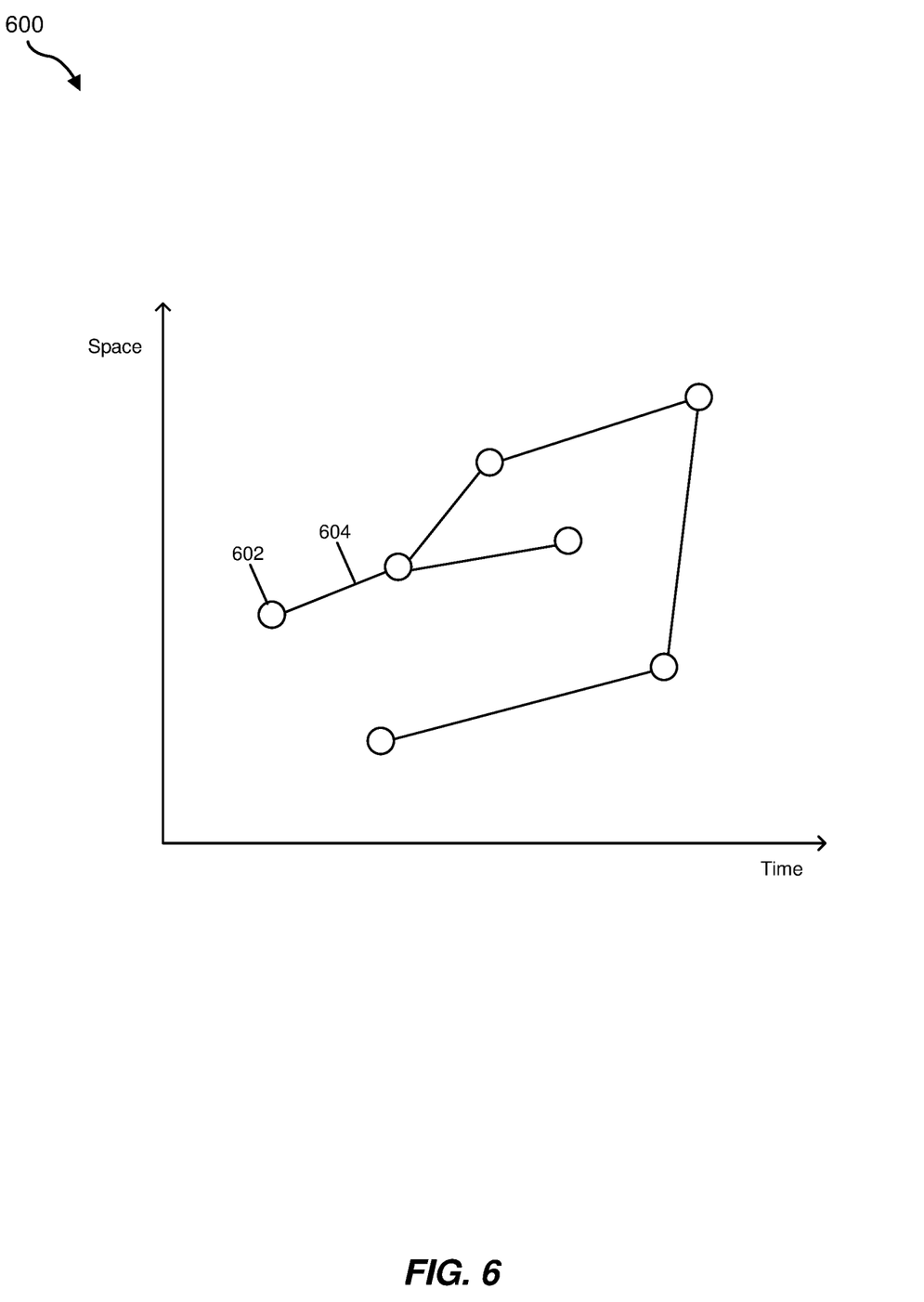
FIG. 6 is a graph corresponding to an event graph for an AR mapping system, according to aspects of the present disclosure.
Figure 7:
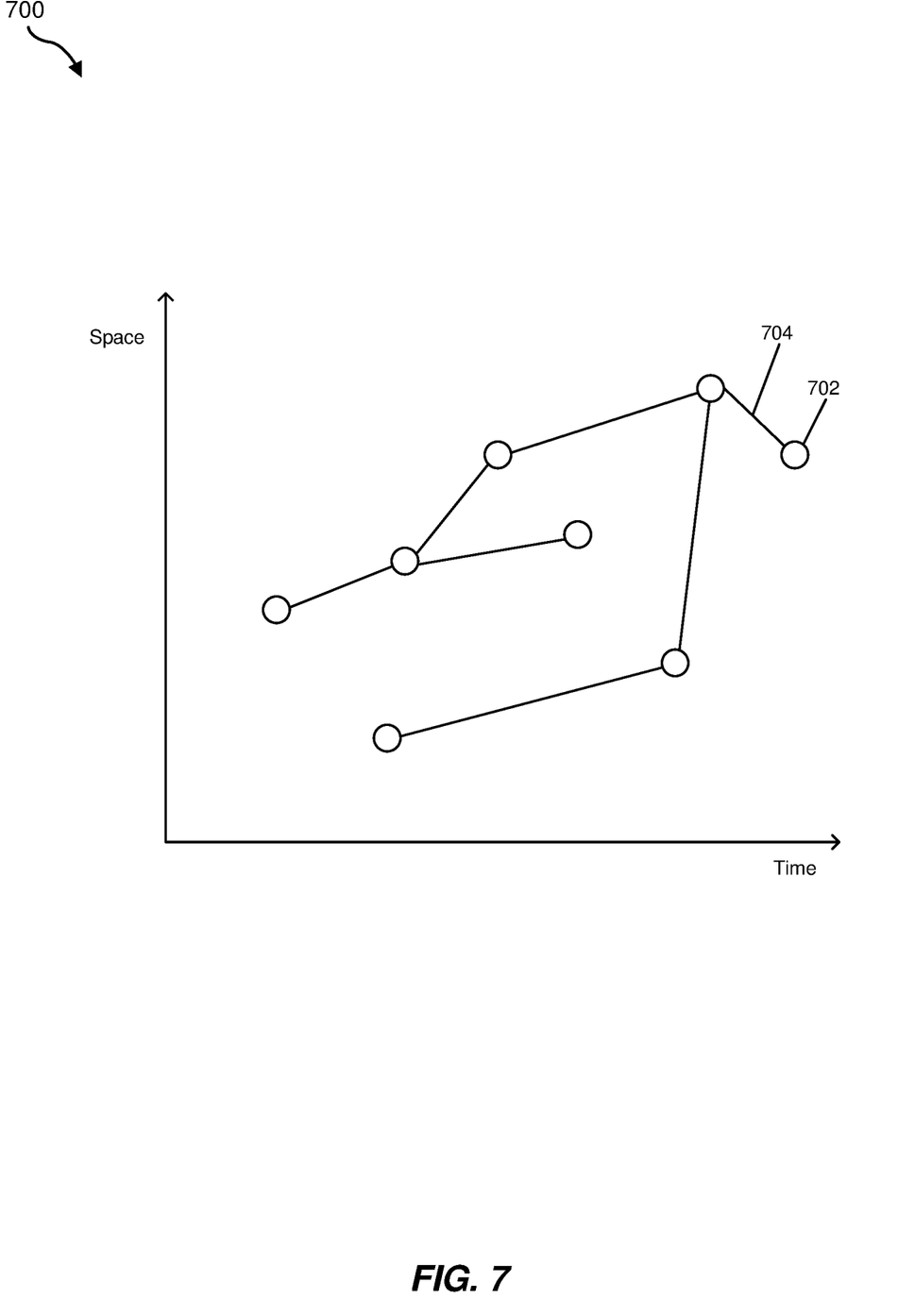
FIG. 7 is the event graph of FIG. 6 with updated data, according to aspects of the present disclosure.

The following will detail an exemplary process of updating an AR mapping system in FIG. 1. FIG. 2 depicts an exemplary AR mapping system. FIG. 3 depicts an exemplary network environment for the AR mapping system. FIG. 4 depicts an exemplary data pipeline for an AR mapping system. FIGS. 5A-5B depict exemplary layers corresponding to data maintained by an AR mapping system. FIGS. 6-7 depict an exemplary event graph of an AR mapping system.

FIG. 1 is a flow diagram of an exemplary computer-implemented method 100 for updating an AR mapping system. The steps shown in FIG. 1 may be performed by any suitable computer-executable code and/or computing system, including the system(s) illustrated in FIG. 2 and/or FIG. 3. In one example, each of the steps shown in FIG. 1 may represent an algorithm whose structure includes and/or is represented by multiple sub-steps, examples of which will be provided in greater detail below.

As illustrated in FIG. 1, at step 110 one or more of the systems described herein may receive, from a plurality of devices in an environment, real-time data associated with the environment.

In some embodiments, the term "real-time" may refer to an operation that occurs without significant and/or unavoidable delay. Real-time operations may be limited by, for instance, device sensor processing speeds, network communication speeds, system processing speeds, etc. Real-time data may include video data, audio data, timestamps, and/or other data based on sensor data from the environment.

The systems described herein may perform step 110 in a variety of ways. FIG. 2 is a block diagram of an example system 200 for maintaining an AR mapping system. As illustrated in this figure, example system 200 may include one or more modules 202 for performing one or more tasks. As will be explained in greater detail below, modules 202 may include a receiving module 204, a current data module 206, a mapping delta module 208, an object delta module 210, an updating module 212, and a sending module 214. Although illustrated as separate elements, one or more of modules 202 in FIG. 2 may represent portions of a single module or application.

In certain embodiments, one or more of modules 202 in FIG. 2 may represent one or more software applications or programs that, when executed by a computing device, may cause the computing device to perform one or more tasks. For example, and as will be described in greater detail below, one or more of modules 202 may represent modules stored and configured to run on one or more computing devices, such as the devices illustrated in FIG. 3 (e.g., computing devices 302(1)-(N) and/or server 306). One or more of modules 202 in FIG. 2 may also represent all or portions of one or more special-purpose computers configured to perform one or more tasks.

As illustrated in FIG. 2, example system 200 may also include one or more memory devices, such as memory 240. Memory 240 generally represents any type or form of volatile or non-volatile storage device or medium capable of storing data and/or computer-readable instructions. In one example, memory 240 may store, load, and/or maintain one or more of modules 202. Examples of memory 240 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 2, example system 200 may also include one or more physical processors, such as physical processor 230. Physical processor 230 generally represents any type or form of hardware-implemented processing unit capable of interpreting and/or executing computer-readable instructions. In one example, physical processor 230 may access and/or modify one or more of modules 202 stored in memory 240. Additionally or alternatively, physical processor 230 may execute one or more of modules 202 to facilitate maintain the mapping system. Examples of physical processor 230 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 2, example system 200 may also include one or more additional elements 220, such as real-time data 250, baseline map data 256, and an event graph 260. Real-time data 250, baseline map data 256, and/or event graph 260 may be stored on a local storage device, such as memory 240, or may be accessed remotely. Real-time data 250 may represent data received from devices in an environment, and may include current mapping data 252 and current object data 254, as will be explained further below. Real-time data 250 may also, in certain implementations, include data relating to a source device of the real-time data 250. Event graph 260 may represent data corresponding to objects in the environment and relationships therebetween, and may include state data 262 and relationship data 264, as will be explained further below.

Baseline map data 256 may include data corresponding to mapping data of the environment. Baseline map data 256 may include data regarding static features of the environment, including but not limited to walls, floors, ceilings, windows, doors, large tables, etc. Baseline map data 256 may further include coordinate data for the static features, which may define locations of the static features. A coordinate system for the coordinate data may be relative, such as coordinates with respect to a specific point in the environment. For example, if the environment covered by the mapping system is limited to a single floor or level of a building, the coordinate data may be defined relative to a specific point on the level. Alternatively, the coordinate system may be global, such as defined by latitude and longitude. In addition, the coordinate system may include more than two dimensions. The coordinate system may also be 3D and may include height locations for the features.

Example system 200 in FIG. 2 may be implemented in a variety of ways. For example, all or a portion of example system 200 may represent portions of example network environment 300 in FIG. 3.

FIG. 3 illustrates an exemplary network environment 300 implementing aspects of the present disclosure. The network environment 300 includes computing devices 302(1)-(N), a network 304, and server 306. Computing device 302 may be a client device or user device, such as an AR device (e.g., AR glasses), a desktop computer, laptop computer, tablet device, smartphone, or other computing device. Computing device 302 may include a physical processor 330, which may be one or more processors, memory 340, which may store data such as real-time data 250, a sensor 370 capable of detecting real-time data 250 from the environment, and a display 380. In some implementations, computing device 302 may represent an AR device such that display 380 overlays images onto a user's view of his or her local environment. For example, display 380 may include a transparent medium that allows light from the user's environment to pass through such that the user may see the environment. Display 380 may then draw on the transparent medium to overlay information. Alternatively, display 380 may project images onto the transparent medium and/or onto the user's eyes. Computing device 302 may also include, in some implementations, a speaker 382 for sound output.

Sensor 370 may include one or more sensors, such as a camera, a microphone, and other sensors capable of detecting features and/or objects in the environment. Computing device 302 may be capable of collecting real-time data 250 using sensor 370 for sending to server 306.

Server 306 may represent or include one or more servers capable of hosting a mapping system. The mapping system may process real-time data 250 from computing devices 302(1)-(N) to build, maintain, and/or update baseline map data 256 and event graph 260. In some examples, the mapping system may represent an AR-mapping system, which may process data for display on AR devices. The server 306 may include a physical processor 330, which may include one or more processors, memory 340, which may store modules 202, and additional elements 220, such as baseline map data 256 and event graph 260.

Computing device 302 may be communicatively coupled to server 306 through network 304. Network 304 may represent any type or form of communication network, such as the Internet, and may comprise one or more physical connections, such as LAN, and/or wireless connections, such as WAN.

Returning to FIG. 1, in one example, receiving module 204 of system 200 and/or server 306 may receive, from one or more computing devices 302 in an environment, real-time data 250 associated with the environment. Real-time data 250 may be associated with objects in the environment, which may include inanimate objects, humans, and/or other recognizable objects detected by computing devices 302. For example, computing device 302 may be located in a single level of a building, collecting and sending real-time data 250 for that building level.

FIG. 4 shows an exemplary pipeline 400 depicting data flow for a mapping system. As shown in this figure, FIG. 4 may include a mapping system 406, which may correspond to system 200 and/or server 306, and a local device 402, which may correspond to computing device 302. Mapping system 406 may receive raw data 450, which may correspond to real-time data 250. Raw data 450 may include video data, audio data, and/or other sensor data collected from the environment. Raw data 450 may also include position and/or orientation data from the source device. In some examples, raw data 450 may require further processing by mapping system 406.

Returning to FIG. 1, at step 120 one or more of the systems described herein may determine, from the real-time data, current mapping data and current object data for the environment. For example, current data module 204 of system 200 and/or server 306 may determine current mapping data 252 and current object data 254 from real-time data 250.

Current mapping data 252 may include coordinate data that conforms to the coordinate system of baseline map data 256 and describes positions and/or orientations of objects within the environment. Specifically, current mapping data 252 may include coordinate data for both static features in the environment and for the objects represented by current object data 254. For example, the coordinate data may include current coordinate data for humans, furniture items, and/or structural features detected by computing device 302 in the environment.

Current object data 254 may include state data and relationship data for the objects detected by computing device 302 in the environment. The state data may, for example, describe conditions of the objects. Specifically, the state data may correspond to attributes, properties, and/or other distinguishing features of the objects. As detailed below, this state data, in conjunction with the coordinate data, may enable an AR mapping system to generate complete recreation of the objects (including their position, orientation, state, etc.) within the environment, for example for display on an AR device.

In some embodiments, the term "state data" may refer to data which may describe a condition of an object with respect to attributes and/or circumstances. State data for a human may include, for instance, a head pose, an eye state, audio data, a hand state, a breathing rate, a heart rate, and/or other physiological attributes, among many other potential examples. The state data for an inanimate object may include, for instance, an object type, an instance identification, a pose, and/or an attribute specific to the object type, such as whether a door is open, among many other potential examples. The state data may provide for a complete state of the environment.

In some embodiments, the term "relationship data" may refer to data which may describe relationships between objects. Relationships between objects may include, for example, interactions between objects, status changes caused by objects, combinations, and/or other connections between objects. Interactions may include, for example, picking up and/or putting down, carrying, placing on, attaching to, looking at, talking to, listening to, touching, etc. For instance, a person may grab a chair, creating a relationship. In some examples, the relationship data may describe changes in states of objects. The state data may further be used to determine the relationship data. For example, tracking a person's hands, eyes, and/or voice may aid in identifying a target object of the person's interaction.

The systems described herein may perform step 120 in a variety of ways. In one example, artificial intelligence (AI) agent 432 of mapping system 406 may process raw data 450 using machine learning. AI agent 432 may be implemented in software and/or hardware. AI agent 432 may recognize objects and structural features from the video data. A data pipeline for AI agent 432 may be divided into map processor 434 and object processor 436. In some examples, map processor 434 and/or object processor 436 may be integrated with AI agent 432, or may be implemented with separate hardware and/or software.

Map processor 434 may determine coordinate data by calculating distances between the recognized objects and structural features, and may use a position and/or orientation of the source devices of raw data 450 to determine the coordinate data. For example, the video data from raw data 450 may be used to calculate the distances between objects. Using the distances between objects and one or more reference points, such as the position of the source devices, coordinate data of the objects may be determined.

Object processor 436 may recognize the objects and structural features and may further use machine learning to identify the state data for the objects and structural features. For example, by analyzing video data from raw data 450, object processor 436 may, using machine learning, recognize and classify objects as well as determine state data for the objects. Other data may be used to determine the state data, such as audio data, the positions and/or orientations of the source devices, proximity between objects, etc.

Returning to FIG. 1, at step 130 one or more of the systems described herein may determine mapping deltas between the current mapping data and baseline map data that includes features of the environment. For example, mapping delta module 208 of system 200 and/or server 306 may determine mapping deltas between current mapping data 252 and baseline map data 256.

Baseline map data 256 may include data representing static features of the environment, such as a single level of a building. Baseline map data 256 may include static features of the environment, such as floor plans, walls, floors, ceilings, large tables, doors, windows, static furniture items, and structural features of the environment. The static features may define the environment, for instance by defining limits of where objects may move or be placed and further by defining or providing a reference for the coordinate system.

In certain implementations, baseline map data 256 may be divided into granular levels. For instance, a first or lowest level may correspond to a floor plan of the environment. A second level may include sparse set of features populating the first level. Higher levels may include classes of structural elements, textures of the structural elements, and instances of the structural elements. The instances may correspond to specific objects. In other implementations, there may be fewer or more levels.

Baseline map data 256 may be previously established, for instance, by having a known floor plan and static features input as baseline map data 256. Alternatively or in addition, baseline map data 256 may be built up from successive scans by devices in the environment. In other words, baseline map data 256 may be an aggregation of previously received mapping data.

FIG. 5A shows a base layer 501, which may correspond to a 2D representation of baseline map data 256 and which may not be shown to scale. Base layer 501 may resemble a floor plan and may include structural features 510, static furniture 512, and static element 514. Structural features 510 may include walls, doors, windows, and other structural features of the environment. Static furniture 512 may include tables, and other furniture which are not normally moved, such as benches, sofas, desks, etc. Static elements 514 may include other features which may remain static, such as large plants, statues, and other decorative and/or functional elements in the environment.

Returning to FIG. 1, the systems described herein may perform step 130 in a variety of ways. In one example, AI agent 432, by way of map processor 434, may determine differences between map database 456, which may correspond to baseline map data 256, and the current mapping data from raw data 450. The mapping deltas may be defined relatively, for example by identifying which features have changed and determining translations to their new coordinates. Alternatively, the mapping deltas may be defined by any feature having different coordinates than in map database 456.

In certain instances, the mapping deltas may have inconsistencies and/or conflicts between source devices. As multiple devices send data, a first device's data regarding a feature may differ from a second device's data regarding the same feature. For example, the first device may have recorded the feature before the second device and therefore send outdated data. Inconsistencies may be resolved by prioritizing data. For example, data having a more recent timestamp may take priority than data having an older timestamp. Similarly, data from a source device closer to the feature in question or having a higher resolution detection capability may take priority. In certain implementations, the inconsistencies may be combined, for example using a weighted average based on priority.

At step 140, one or more of the systems described herein may determine object deltas between the current object data and an event graph that includes prior state data and prior relationship data for objects in the environment. For example, object delta module 210 of system 200 and/or server 306 may determine object deltas between current object data 254 and event graph 262.

Event graph 260 may include state data 262 and relationship data 264. Event graph 260 may include data for all objects detected in the environment. State data 262 may include space-time state data of the objects in the environment. The space-time state data may indicate position data over time for the objects in the environment. State data 262 may therefore include prior state data of the objects such that changes in the states of the objects are tracked. Relationship data 264 may include transition data linking the various states of the objects. The transition data may correspond to events that indicate interactions between the objects in the environment. Event graph 260 may be stored as a multidimensional matrix or other data structure capable of storing the space-time data and transition data.

FIG. 6 shows an event graph 600 which may correspond to a graph representation of event graph 260. Event graph 600 may include nodes 602 and edges 604. Event graph 600 may have two dimensions, depicted as a time axis and a space axis in FIG. 6, although in other implementations event graph 600 may include more dimensions, such as additional space dimensions and dimensions corresponding to attributes of the state data.

Nodes 602 may correspond to states of objects. At a given time along the time axis, the space (e.g. position) of the object may be represented by nodes 602. Edges 604 linking nodes 602 may correspond to transition data between the states represented by nodes 602. Transitions may indicate interactions, such as moving or being moved. The convergence of nodes 602 may indicate that the corresponding objects have interacted.

FIG. 5B depicts an example live layer 502, which may correspond to a simplified 2D environment representation of event graph 260 and which may not be shown to scale. Live layer 502 may represent dynamic or otherwise non-static objects in the environment. Live layer 502 may include a human 520, a prior state 522, an object 524, and a human 526. Although FIG. 5B illustrates simplified forms of the objects, because the state data and relationship data may include pose and orientation data, robust 3D representations of objects may be available. Prior state 522 may indicate prior states, such as prior locations, of human 520. Thus, prior state 522 may show where human 520 has traveled. Human 526 is shown proximate to object 524. The states of human 526 and object 524 have changed, which may indicate an interaction. Specifically, human 526 may have relocated object 524.

In certain implementations the devices in the environment may be represented as distinct objects or may be closely related to another object. For example, a human may be wearing an AR device, which may be distinguishable from a human without an AR device. In addition, a human wearing an AR device may include a consistent stream of state and relationship data updates.

Returning to FIG. 1, the systems described herein may perform step 140 in a variety of ways. In one example, AI agent 432, by way of object processor 436, may determine differences between the current object data from raw data 450 and event graph 460, which may correspond to event graph 260. Object database 462 may include all recognized objects from the environment. In some implementations, object database 462 may be incorporated within event graph 460 and/or map database 456. The object deltas may be defined by changes in state and relationships from the prior states and prior relationships in event graph 460. Similar to the mapping deltas described above, the object deltas may have inconsistencies and/or conflicts between source devices, which may be resolved by prioritizing data. For example, data having a more recent timestamp may take priority. Similarly, data from a source device closer to the feature in question or having a higher resolution detection capability may take priority. In certain implementations, the inconsistencies may be combined, for example using a weighted average based on priority.

At step 150, one or more of the systems described herein may update the baseline map data based on the mapping deltas and update the event graph based on the object deltas. For example, updating module 212 of system 200 and/or server 306 may update baseline map data 256 based on the mapping deltas, and may update event graph 260 based on the object deltas.

The systems described herein may perform step 150 in a variety of ways. In one example, AI agent 432, by way of map processor 434, may update map database 456. Additionally, AI agent 432, by way of object processor 436, may update event graph 460. In certain implementations object processor 436 may also update object database 462.

Updating the event graph based on the object deltas may further include recognizing an object in the object deltas as an object in event graph 460, creating a new node for the recognized object in event graph 460 based on state data from the object deltas, and linking the new node with a prior node for the recognized object in event graph 460 based on relationship data from the object deltas. For example, FIG. 7 shows an event graph 700, which may be an updated version of event graph 600 in FIG. 6. In FIG. 7, a new node 702 may be added, and a new edge 704 may connect the new node to a prior node. The object deltas may indicate that an object has moved from its most recent node in event graph 600. The movement of the object may be represented in event graph 700 with the placement of new node 702, and new edge 704 connecting to the object's next recent node. As the object's state changes over time, additional nodes and edges may be added to event graph 700 for each new state.

Updating baseline map data 256 may ensure that baseline map data 256 includes the most current structural features of the environment. For example, in FIG. 5, updating base layer 501 may result in mapping out additional structural features 510. Updating event graph 260 may ensure that event graph 260 includes the most current state data 262 and relationship data 264 for the objects in the environment. In addition, baseline map data 256 and event graph 260 may be initially seeded with minimal data, as over time the devices in the environment may provide data for areas and/or objects missing from baseline map data 256 and event graph 260.

In some examples, baseline map data 256 and event graph 260 may be updated in a distributed fashion. Multiple devices in the environment may allow tracking of more of the environment than a single device. In addition, the devices may move throughout the environment, allowing updates to different areas than static devices. The mapping system may coordinate aggregation of the data such that each individual device may not be required to request data from another individual device in the environment.

Event graph 260 may be analyzed to further determine characteristics of objects and/or relationships therebetween. By analyzing movement and/or relationship patterns of a specific object over time, inferences may be made as to current and/or future states and relationships of the specific object. For example, if an object is lost (e.g. its current location is unknown), analyzing the last known location and probably movement may provide an accurate prediction of its current location. If a human tends to walk along a certain path at a certain time of day, the human's location may be predicted at a similar time of day. Further analysis of event graph 260 may reveal additional characteristics of objects.

Other aspects of event graph 260 may be analyzed. For example, a specific time window may be analyzed to determine what types of interactions occur, which locations become crowded, etc. Changes to the environment may be monitored to determine their effects. Changing structural features, such as changing walls and/or doors and/or other normally static features, may cause changes to object interactions. The interactions may then be compared to the interactions before the structural changes.

In certain implementations, event graph 260 may include virtual objects. Virtual objects may be objects that are not detected by devices in the environment. For example, a predicted object location may be represented by a virtual object. In addition, users may place virtual objects in the environment, for instance for interaction by other users.

Returning to FIG. 1, at step 160 one or more of the systems described herein may send updated baseline map data and updated event graph data to the plurality of devices. For example, sending module 214 of system 200 and/or server 306 may send portions of baseline map data 256 and portions of event graph 260 to computing device 302.

The systems described herein may perform step 160 in a variety of ways. In one example, mapping system 406 may send portions of map database 456, event graph 460, and/or object database 462 to a local device 402, which may correspond to computing device 302.

Local device 402 may include a local AI agent 433, a local map database 457, a local event graph 461, and a local object database 463. Local map database 457 may be a subset of map database 456. Local event graph 461 may be a subset of event graph 460. Local object database 463 may be a subset of object database 462. Local AI agent 433 may receive data from mapping system 406 and update the local databases. The local databases may allow local device 402 to maintain its own local representation of the environment.

The disclosed mapping system may be used to keep track of objects in the environment. A user may be able to keep track of his or her possessions. For instance, the user may be able to locate missing objects such as his or her keys, laptop, etc. Even if the mapping system lacks the most current data for the missing objects, the user may be able to ascertain the last known locations to find the missing objects. Alternatively, the user may be able to examine previous locations of the missing objects to track their movements and extrapolate their current locations. If the user is using an AR device, the user may be able to look around the environment and locate the missing objects visually. For example, the AR device may highlight an object when the user faces the object or may display direction indicators to point the user towards the object.

The user may also be able to determine which objects and/or persons have interacted with objects. For instance, the user may see that a second person used the user's laptop before the laptop went missing. The user may then be able to ask the second person about the laptop's current whereabouts. The user may be able to locate the second person, as well. For instance, if the second person was wearing an AR device, the user may be able to see where the second person is in real time and ascertain where the second person has been and who or what the second person interacted with. If the second person was not wearing an AR device, the user may be able to determine where the second person has been, the second person's movement habits throughout the environment, and estimate where the second person currently is.

The user may also create virtual objects for other users to interact with. For example, the user may create a virtual note and leave it on a wall. A second user, using an AR device, may be able to see the virtual note.

As detailed above, the disclosed mapping system may collect data about the environment from multiple devices within the environment. The mapping system may include data representations of nearly all device-detectable aspects of the environment, which may be further saved over time. The mapping system may therefore recreate the environment in its current configuration as well as past configurations. This may also allow analysis of changes in the environment over time. The mapping system may send data to the devices in the environment such that the devices have a larger view of the environment than would normally be available to individual devices. The devices may be able to recreate the entire environment even without being able to detect the entire environment. The mapping system may thus leverage multiple devices to be able to recreate the environment more efficiently than a single device in the environment would allow for.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive real-time data to be transformed, transform the real-time data, use a result of the transformation to determine mapping deltas with baseline map data and object deltas with an event graph, and store the result of the transformation to update the baseline map data and the event graph. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Embodiments of the instant disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
receiving, from a plurality of devices in an environment, real-time data associated with the environment;

determining, from the real-time data, current mapping data and current object data for the environment, wherein the current mapping data includes coordinate data for the environment and the current object data includes both state data and relationship data for objects in the environment detected by the plurality of devices;
determining mapping deltas between the current mapping data and baseline map data that includes features of the environment;
determining object deltas between the current object data and an event graph, wherein the event graph includes prior state data and prior relationship data for objects in the environment;
updating the baseline map data based on the mapping deltas;
updating the event graph based on the object deltas by:
recognizing an object in the object deltas as an object in the event graph;
creating a new node for the recognized object in the event graph based on state data from the object deltas; and
linking the new node with a prior node for the recognized object in the event graph based on relationship data from the object deltas; and
sending updated baseline map data and updated event graph data to the plurality of devices.

2. The method of claim 1, wherein the state data of the event graph includes space-time state data of the objects in the environment that indicates position data over time of the objects in the environment, and the relationship data of the event graph includes transition data linking nodes of the space-time state data.

3. The method of claim 2, wherein the transition data corresponds to events that indicate interactions between the objects in the environment.

4. The method of claim 1, wherein the baseline map data includes at least one of a floor plan, a wall, a ceiling, a structural feature, or a static furniture item in the environment.

5. The method of claim 1, wherein the objects in the environment include at least one of an inanimate object or a human.

6. The method of claim 5, wherein the state data for a human includes at least one of a head pose, an eye state, audio data, a hand state, a breathing rate, or a heart rate.

7. The method of claim 5, wherein the state data for an inanimate object includes at least one of an object type, an instance identification, a pose, or an attribute.

8. The method of claim 1, further comprising predicting, for an unknown state of an object, inferred state data for the object based on analyzing the prior state data and the prior relationship data for the object.

9. A system comprising:
one or more processors;
a memory device comprising instructions that when executed by the one or more processors cause the system to:
receive, from a plurality of devices in an environment, real-time data associated with the environment;
determine, from the real-time data, current mapping data and current object data for the environment, wherein the current mapping data includes coordinate data for the environment and the current object data includes both state data and relationship data for objects in the environment detected by the plurality of devices;
determine mapping deltas between the current mapping data and baseline map data that includes features of the environment;
determine object deltas between the current object data and an event graph, wherein the event graph includes prior state data and prior relationship data for objects in the environment;
update the baseline map data based on the mapping deltas;
update the event graph based on the object deltas by:
recognizing an object in the object deltas as an object in the event graph;
creating a new node for the recognized object in the event graph based on state data from the object deltas; and
linking the new node with a prior node for the recognized object in the event graph based on relationship data from the object deltas; and
send updated baseline map data and updated event graph data to the plurality of devices.

10. The system of claim 9, wherein the state data of the event graph includes space-time state data of the objects in the environment that indicates position data over time of the objects in the environment, and the relationship data of the event graph includes transition data linking nodes of the space-time state data.

11. The system of claim 10, wherein the transition data corresponds to events that indicate interactions between the objects in the environment.

12. The system of claim 9, wherein the baseline map data includes at least one of a floor plan, a wall, a ceiling, a structural feature, or a static furniture item in the environment.

13. The system of claim 9, wherein the objects in the environment include at least one of an inanimate object or a human, wherein the state data for a human includes at least one of a head pose, an eye state, audio data, a hand state, a breathing rate, or a heart rate, and wherein the state data for an inanimate object includes at least one of an object type, an instance identification, a pose, or an attribute.

14. The system of claim 9, wherein the instructions further comprise instructions for predicting, for an unknown state of an object, inferred state data for the object based on analyzing the prior state data and the prior relationship data for the object.

15. A non-transitory computer-readable medium comprising computer-readable instructions that, when executed by at least one processor of a computing device, cause the computing device to:
receive, from a plurality of devices in an environment, real-time data associated with the environment;
determine, from the real-time data, current mapping data and current object data for the environment, wherein the current mapping data includes coordinate data for the environment and the current object data includes both state data and relationship data for objects in the environment detected by the plurality of devices;
determine mapping deltas between the current mapping data and baseline map data that includes features of the environment;
determine object deltas between the current object data and an event graph, wherein the event graph includes prior state data and prior relationship data for objects in the environment;
update the baseline map data based on the mapping deltas;
update the event graph based on the object deltas by:
recognizing an object in the object deltas as an object in the event graph;

creating a new node for the recognized object in the event graph based on state data from the object deltas; and linking the new node with a prior node for the recognized object in the event graph based on relationship data from the object deltas; and send updated baseline map data and updated event graph data to the plurality of devices.

16. The non-transitory computer-readable medium of claim 15, wherein the state data of the event graph includes space-time state data of the objects in the environment that indicates position data over time of the objects in the environment, and the relationship data of the event graph includes transition data linking nodes of the space-time state data.

17. The non-transitory computer-readable medium of claim 16, wherein the transition data corresponds to events that indicate interactions between the objects in the environment.

18. The non-transitory computer-readable medium of claim 15, wherein the baseline map data includes at least one of a floor plan, a wall, a ceiling, a structural feature, or a static furniture item in the environment.

19. The non-transitory computer-readable medium of claim 15, wherein the objects in the environment include at least one of an inanimate object or a human, wherein the state data for a human includes at least one of a head pose, an eye state, audio data, a hand state, a breathing rate, or a heart rate, and wherein the state data for an inanimate object includes at least one of an object type, an instance identification, a pose, or an attribute.

20. The non-transitory computer-readable medium of claim 15, wherein the instructions further cause the computing device to predict, for an unknown state of an object, inferred state data for the object based on analyzing the prior state data and the prior relationship data for the object.

* * * * *